United States Patent [19]

Abo et al.

[11] Patent Number: 4,685,302
[45] Date of Patent: Aug. 11, 1987

[54] CONTROL SYSTEM FOR VARIABLE GEOMETRY TURBOCHARGER

[75] Inventors: Toshimi Abo, Yokohama; Takashi Ueno; Akio Sumizawa, both of Yokosuka, all of Japan

[73] Assignee: Nissan Motor Co., Ltd., Kanagawa, Japan

[21] Appl. No.: 719,537

[22] Filed: Apr. 3, 1985

[30] Foreign Application Priority Data

Apr. 4, 1984 [JP] Japan ................................. 59-65696

[51] Int. Cl.[4] ........................................... F02B 37/00
[52] U.S. Cl. .................................................. 60/602
[58] Field of Search .................. 60/600, 601, 602, 603

[56] References Cited

U.S. PATENT DOCUMENTS 4,177,066 12/1979 Nancarrow ........................... 60/602
4,509,331 4/1985 Hirabayashi .......................... 60/602

FOREIGN PATENT DOCUMENTS

2151658 4/1973 Fed. Rep. of Germany ........ 60/602
18522 2/1983 Japan .................................... 60/602

Primary Examiner—Douglas Hart
Attorney, Agent, or Firm—Schwartz, Jeffery, Schwaab, Mack, Blumenthal & Evans

[57] ABSTRACT

A control system is provided for a variable geometry turbocharger of an internal combustion engine including a turbine which is operated in response to an exhaust gas and a compressor connected to the turbine to supply the engine with supercharging compressor. The control system calculates a control value on the basis of the rotational speed of the engine and the load on the engine so as to control the exhaust gas to be supplied to the turbine. In addition, the control system is provided with a limiting means to limit the change of the control value within a predetermined range.

16 Claims, 7 Drawing Figures

CONTROL SYSTEM FOR VARIABLE GEOMETRY TURBOCHARGER

TECHNICAL FIELD OF THE INVENTION

The invention relates to a control system for a variable geometry turbocharger which feeds an exhaust gas from an engine through a variable area inflow passage to a turbine for rotation thereof, which in turn drives a compressor for variably controlling the supercharged pressure of intake air supplied to the engine.

RELATED ART AND ASSOCIATED PROBLEMS

There is proposed an engine which permits an increased torque to be achieved over a range from a low speed to a high speed, by the provision of a variable geometry turborcharger as disclosed in U.S. Pat. No. 4,404,804. Specifically, with this turbocharger, an exhaust gas from an engine is used to rotate a turbine, the rotation of which drives a compressor to provide for the supercharged pressure of intake air supplied to the engine, thereby increasing the fuel injection volume and consequently the output. However, if the supercharging pressure becomes excessive, an excessive stress is imposed on the engine and on its intake and exhaust gas system with the attendant risk of damage or destruction. Accordingly, many means have been developed to prevent an excessive increase in supercharging pressure, and to provide for flow flexibility and pressure variability throughout operation. For example, a hinged flap or valve is disposed within an inlet to the turbine so as to vary the cross-sectional area of a variable area inflow passage of exhaust gas to the turbine. The flap or valve is controlled in accordance with the operating conditions such as the number of revolutions of and a load on the engine or the like to vary the cross-sectional area of the passage, thereby properly controlling the supercharged pressure of intake air supplied to the engine.

To control the opening of the flap or valve which varies the cross-sectional area of the inflow passage, a control system for such turbocharger includes a solenoid valve, the duty value of which is controlled in order to control the opening of the hinged flap in a manner simply in accordance with the operating conditions, e.g. the number of revolutions of, or a load on the engine. With such control, if an accelerator pedal is released to effect a gear shift during an accelerating process, for example, a load on the engine, and accordingly the width of a fuel feed pulse, reduces rapidly, whereby the hinged flap will be driven in the closing direction. As a consequence, variable geometry or capacity means including the hinged flap will be driven more frequently than is required for each gear shift, resulting in an increased abrasion and a reduced useful life of the variable geometry or capacity means. Therefore, further development is still required in the gas intake system for supercharging in order to maintain flow flexibility and pressure variability throughout operation.

OBJECT AND SUMMARY OF THE INVENTION

It is an object of the invention to provide a control system for variable geometry turbocharger which avoids an unduly frequent drive of the variable geometry or capacity means, thereby improving a useful life thereof.

The above object is achieved by a control system for variable geometry turbocharger of the invention comprising means for detecting the operating conditions such as the number of revolutions of an engine, means for detecting a load on an engine, calculating means for deriving a control signal in accordance with the operating conditions such as the number of revolutions and the load detected, and control means responsive to a control signal for controlling the cross-sectional area of a variable area inflow passage to a variable geometry turbocharger so as to establish a proper value for the supercharged pressure of an intake air supplied to the engine. The control signal from the calculating means is fed to limiter means which corrects the magnitude of the control signal so as to restrict a reduction in the cross-sectional area of the inflow passage, wherein the control signal changes in a direction to reduce such cross-sectional area, and if the magnitude of such change exceeds a given value, the limiter means prevents the cross-sectional area of the inflow passage from being unduly driven in a reducing direction.

DESCRIPTION OF EMBODIMENT

Figure 1:
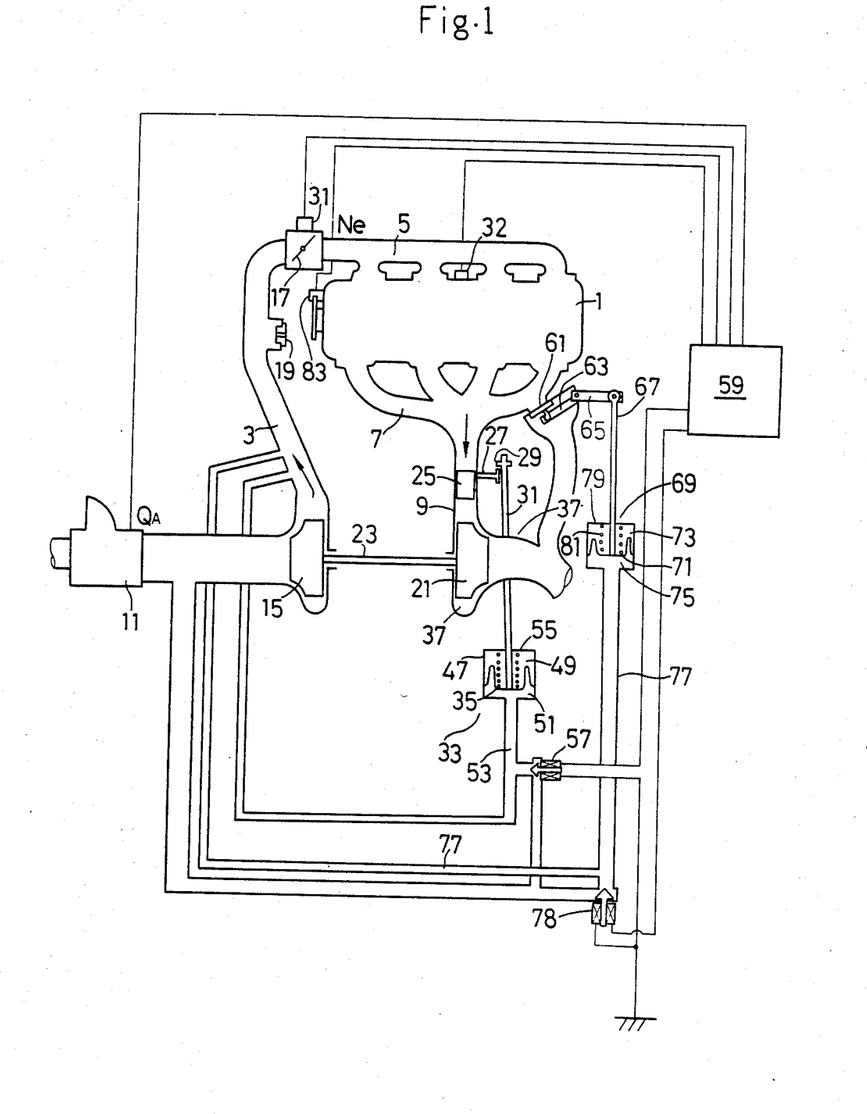
FIG. 1 is a schematic diagram of a variable geometry turbocharger incorporating one embodiment of the constrol system according to the present invention.

FIG. 1 schematically shows an exemplary engine including a variable geometry turbocharger with which the invention may be applied. Engine 1 includes an intake pipe 3 and an intake manifold 5 through which air is supplied. The engine also includes an exhaust manifold 7 and an exhaust pipe 9 through which an exhaust gas is displaced. It will be noted that the intake pipe 3 is folded intermediate its length to extend to the left, with an airflow meter 11 disposed on the end thereof for determining the quantity of intake air $Q_A$. A compressor 15 which forms part of a burbocharger 13 is disposed within the bend in the intake pipe 3. The compressor 15 pressurizes the air supplied through the airflow meter 11 to feed the engine 1. A throttle valve 17 is disposed within the end of the intake pipe 3 which is located adjacent to the intake manifold 5. A relief valve 19 is disposed within the intake pipe 3 intermediate the throttle valve 17 and the compressor 15. The compressor 15 is coupled to a turbine 21, to be described later, through a shaft 23.

Figure 2:
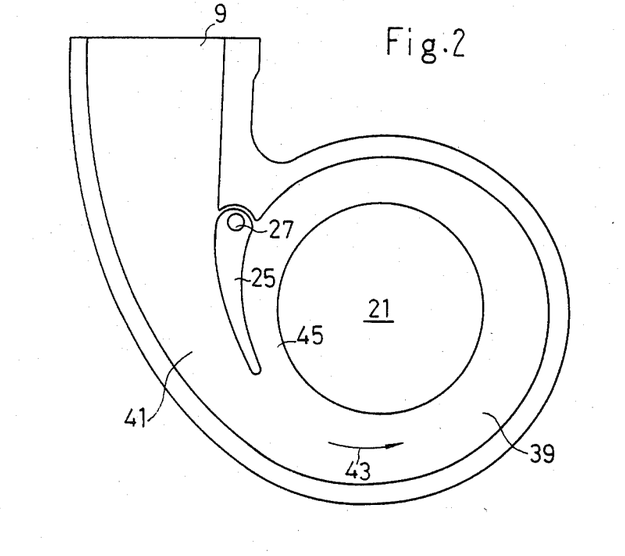
FIG. 2 is an enlarged cross sectional view of a variable geometry section of the turbocharger shown in FIG. 1.

The exhaust pipe 9 is folded to extend to the right, as viewed in FIG. 1, and a turbine chamber 37 is defined in the region of such bend for accommodating the turbine 21. As shown in FIG. 2, the turbine chamber 37 includes a scroll 39 which is formed to surround the turbine 21. It will be noted that the scroll 39 has a cross-sectional area which decreases gradually in a downstream direction, indicated by an arrow 43, from an inflow passage 41 where the exhaust pipe 9 is connected to the turbine chamber 37. Disposed in a region where the inflow passage 41 to the scroll 39 merges with the termination 45 of the latter is a hinged flap 25, which forms a flapper valve to define variable geometry means. The flap 25 is mounted on a pin 27 at its one end so as to be rotatable therearound so that the cross-sectional area of the passage 41 can be increased or decreased.

The pin 27 which carries the flap 25 is coupled through an arm 29 to the upper end of a rod 31, the lower end of which is connected to a diaphragm 35 which forms a flap driving actuator 33. The actuator 33 includes a casing 47 in which the diaphragm 35 is housed and which is divided by the diaphragm into an atmospheric chamber 49 and a positive pressure chamber 51. A spring 55 is disposed within the atmospheric chamber 49 for urging the diaphragm 35 in a direction toward the positive pressure chamber 51. The positive pressure chamber 51 is coupled through a coupling tube 53 to the intake pipe 3 at a point downstream of the compressor 15. Thus, a supercharged pressure from the compressor 15 is fed to the chamber 51, urging the diaphragm 35 into the atmospheric pressure 49 against the resilience of the spring 55. A control means such as solenoid valve 57 is disposed in the coupling tube 53, and when the solenoid valve 57 is driven by a control unit 59 to be open, the coupling tube 53 communicates with the atmosphere through the valve 57, thus reducing the pressure within the chamber 51. Specifically, the solenoid valve 57 is controlled by the unit 59 on the basis of duty control. The greater the duty value, the greater will be the opening of the valve 57, resulting in a greater reduction in the pressure of the chamber 51. Consequently, the spring 55 within the chamber 49 urges the diaphragm 35 downward, and such movement is transmitted to the flap 25 through the rod 31, the arm 29 and the pin 27, whereby the flap 25 moves angularly in a direction to reduce the area of the passage 41 to the turbine 21 or in the closing direction. As a consequence, the flow velocity supplied to the turbine 21 increases, and hence the supercharged pressure supplied to the engine 1 from the compressor 15 rises. Conversely, if the duty value decreases, the opening of the valve 57 is reduced, increasing the pressure within the positive pressure chamber 51 to urge the diaphragm 35 upward against the resilience of the spring 55, whereby the flap 25 moves angularly in a direction to open the inflow passage 41. This results in a reduced flow velocity supplied to the turbine 21, and hence the supercharged pressure supplied to the engine 1 from the compressor 15 decreases.

In FIG. 1, an exhaust pipe is connected to the right-hand bottom portion of the exhaust manifold 7, where a waste gate valve 61 is disposed. The exhaust pipe is communicated with a portion of the exhaust pipe 9 downstream of the turbine 21 in this embodiment. The valve 61 is connected through an arm 63 and a connecting member 65 to one end of an operating rod 67, the other end of which is connected to a diaphragm 71 which forms part of a supercharged pressure actuator 69. The actuator includes a casing 79 in which the diaphragm 71 is housed and which is divided by the diaphragm 71 into an atmospheric chamber 73 and a positive pressure chamber 75. A spring 81 is disposed within the chamber 73 to urge the diaphragm 71 into the positive pressure chamber 75. The chamber 75 is coupled through a coupling tube 77 to the intake pipe 3 at a point downstream of the compressor 15, whereby a supercharged pressure from the compressor 15 is fed to the positive pressure chamber 75.

A solenoid valve 78 is disposed in the coupling tube 77, and when the valve 78 is driven open by the control unit 59, the coupling tube 77 communicates with the atmosphere through the valve 78, thus reducing the pressure within the positive pressure chamber. More specifically, the valve 78 is again controlled on the basis of duty control by the unit 59. The greater the duty value, the greater will be the opening of the solenoid valve, reducing the pressure in the positive pressure chamber. Hence, the spring 81 disposed within the atmospheric chamber drives the diaphragm downward, and such movement is transmitted through the rod 67 and the arm 63 to the waste gate valve 61, which then moves in a direction to close a bypass passage. Conversely, as the duty value decreases, the opening of the valve 78 decreases, thus increasing the pressure within the positive pressure chamber. Accordingly, the diaphragm is driven upward against the resilience of the spring 81, whereby the valve 61 moves in an opening direction. As the valve 61 opens, part of an exhaust gas from the engine 1 finds its way directly to the exterior from the manifold 7. This is effective to reduce the amount of exhaust gas supplied to the turbine to allow a proper supercharged pressure to be introduced into the engine to prevent any likelihood of damage caused to the engine as a result of an excessively high supercharged pressure of intake air supplied to the engine by the turbocharger under a high speed and high load condition of the engine.

The control unit 59 comprises a microcomputer including a microprocessor, a memory and an input/output interface. A signal $Q_A$ indicating the amount of intake air which is derived from the airlow meter 11 and a signal Ne indicating the number of revolutions of the engine 1 which is derived from a crank angle sensor 83 located on the left side of the engine 1 are both input to the control unit 59 through the interface. On the basis of such information with respect to the operating conditions, the control unit 59 performs a suitable control over the duty value of a signal which is used to drive the solenoid valve 57, with consequence that the cross-sectional area of the inflow passage 41 to the turbine 21 is properly controlled by the hinged flap 25, and the supercharged pressure of the intake air supplied to the engine 1 is properly controlled in accordance with the number of revolutions Ne of the engine and the amount of intake air $Q_A$, thus providing an increased torque in a stabilized manner from a low speed to a high speed range. In the event the supercharged pressure is excessively high in the high speed range, the waste gate valve 61 is opened to reduce the exhaust gas supplied to the turbine 21 to allow a proper supercharged pressure to be supplied to the engine 1, thus preventing any reduction in the torque from the engine 1 in the high speed range.

Figure 3:
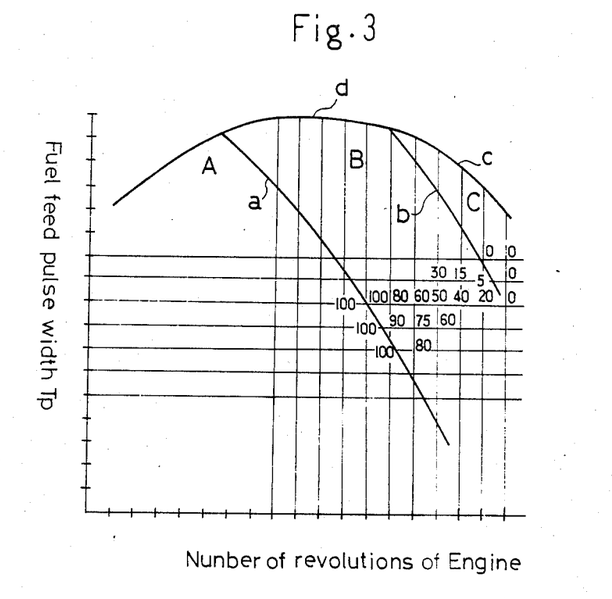
FIG. 3 shows a graph which may be utilized to derive a duty value based on the number of revolutions of an engine and the width of a fuel feed pulse and which also illustrates the relationship between the width of fuel feed pulse and the number of revolutions of the engine, with the cross-sectional area of the inflow passage being varied as a parameter.

More specifically, the memory in the control unit 59 stores a processing program, which is used by the unit 59 to calculate the amount of intake air per revolution, representing a load on the engine, or in other words, the width of a fuel feed pulse Tp for an electronically controlled fuel injection apparatus on the basis of the amount of intake air $Q_A$ and the number of revolutions Ne of the engine according to the following equation:

$$Tp = kQ_A/Ne$$

where k represents a constant. The pulse width Tp calculated in this manner is a parameter which represents the load on the engine. The duty value of a signal which is used to drive the solenoid valve 57 is determined by referring to a graph shown in FIG. 3 where the ordinate represents the pulse width Tp and the abscissa the number of revolutions Ne. It is to be understood that the graph shown in FIG. 3 is previously determined by experiments which determine proper values of duty values for selected values of Ne and Tp. In this manner, a proper duty value can be determined from this graph, and may be used in driving the solenoid valves 57 and 78 to permit an intake air of a proper supercharged pressure to be introduced into the engine 1 so that the latter provides an increased torque from a low speed to a high speed range.

Referring to the graph shown in FIG. 3, a region A represents a low air flow region where the cross-sectional area of the inflow passage 41 may be minimized without causing the supercharged pressure of the intake air supplied to the engine to reach a given value such as +350 mmHg, for example. Thus, the operation in this region takes place with a minimized cross-sectional area of the passage 41, and accordingly the control unit 59 feeds a drive signal having a duty value of 100%, to the solenoid valve 57, as will be noted from FIG. 3. In this manner, the solenoid valve 57 is maintained open, causing the pressure within the positive pressure chamber 51 to be reduced to the atmospheric pressure. Consequently, the diaphragm 35 is driven by the spring 55 into the chamber 51 and such movement is transmitted through the rod 31, arm 29 and pin 27 to cause the flap 25 to be moved in a direction to close the passage 41, thus establishing a minimized area of the passage 41 (fully closed).

A region C represents a high air flow region where if the cross-sectional area of the passage 41 is increased to its maximum (fully open), the supercharged pressure of the intake air supplied to the engine may increase excessively to exceed a given value, giving rise to the likelihood that the engine may be damaged. Accordingly, the duty of the solenoid valve 78 is controlled in this region to activate the actuator 69 so that the waste gate valve 61 is gradually opened so as to bypass the exhaust gas supplied to the turbine 21 and to maintain the supercharged pressure constant. Also, in this region, the area of the inflow passage 41 to the turbine is maximized by establishing a duty value of 0% for the solenoid valve 57, which is therefore fully closed. Since the valve 57 is fully closed, the supercharged pressure prevailing at a point downstream the compressor 15 is directly supplied to the positive pressure chamber 51, whereby the diaphragm 35 is driven into the atmospheric pressure 49 against the resilience of the spring 55. The resulting movement is transmitted through the rod 31, the arm 29 and the pin 27 to the flap 25, which is therefore driven in a direction to open the inflow passage 41, thus establishing a maxmium cross-sectional area thereof.

Referring to the graph shown in FIG. 3, in a region B located between the regions A and C, the supercharged pressure can be controlled by controlling the location of the flap 25 or the cross-sectional area of the inflow passage 41. In this region, a duty value is experimentally determined to establish a supercharged pressure which is appropriate to each operating point.

In FIG. 3, curves a and b represent the characteristic curves or the relation between the width Tp of fuel feed pulse or the torque, plotted against the number of revoluations Ne of the engine when the cross-sectional area of the inflow passage 41 is fixed to its minimum and its maximum value, respectively. As indicated by these characteristic curves, the value Tp decreases with an increase in the number of revolutions Ne when the cross-sectional area of the inflow passage 41 assumes a fixed value. However, it is to be noted that when the cross-sectional area of the inflow passage 41 is varied in an ideal manner in relation to the number of revolutions Ne, an increased torque can be achieved over the entire range of the number of revolutions Ne, as indicated by a curve d which represents an envelope of the individual curves a and b.

Figure 4:
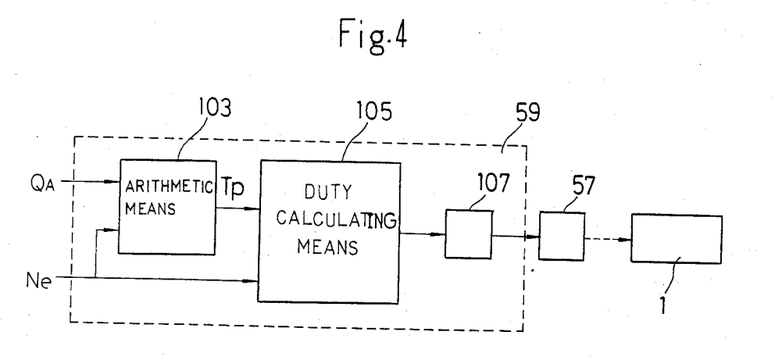
FIG. 4 is a block diagram of a control system for variable geometry turbocharger according to one embodiment of the invention.

FIG. 4 is a block diagram of a control system for a variable geometry turbocharger according to one embodiment of the invention. The control system is adapted to control the variable geometry turbocharger having a construction as indicated in FIG. 1. As mentioned previously, the control unit 59 (FIG. 1) may comprise a microprocessor, a memory and an input/output interface, for example. To implement a program which is stored in the memory, there are provided arithmetic means 103, duty value calculating means 105 and limiter means 107. The arithmetic means 103 receives signals indicating the amount of intake air $Q_A$ and the number of revolutions Ne of the engine from the airflow meter and from the crank angle sensor, respectively, and in response thereto, derives the width Tp of fuel feed pulse corresponding to the amount of intake air per revolution which represents a load on the engine. A signal indicative of the pulse width Tp is fed to the duty value calculating means 105 together with a signal indicative of the number of revolutions Ne. The calculating means 105 stores a look-up table of discrete duty values which are appropriate for selected values of the number of revolutions Ne and the pulse width Tp, in a manner as indicated by the graph of FIG. 3. Thus, the calculating means 105 is capable of outputting a duty value which is appropriate for input values of Ne and Tp. The output duty value is fed to the limiter means 107 where a rate of change in the duty value is detected, and the output duty value is restricted by the limiter means 107 whenever the duty value changes in an increasing direction and the rate of change or the absolute magnitude of the change exceeds a given value.

More specifically, the limiter means 107 is operative to check a rate of change with time of the duty value fed from the calculating means 105. This may be accomplished, for example, by subtracting a particular duty value which is currently used to control the turbocharger from the duty value derived by the calculating means 105 and seeing if the difference is greater than a given value. Specifically, if the duty value derived by the calculating means 105 exceeds a current duty value by a given amount, this means that a rapid increase in the duty value is occurring. An increase in the duty value signifies that the exhaust gas inflow passage to the turbine is reduced by moving the flap 25 in the closing direction, as mentioned previously in connection with FIG. 1. A rapid movement in the closing direction means that a gear shift has taken place during an accelerating phase. If it is found by the limiter means 107 that the difference between the calculated duty value and the current duty value which is presently used to control the turbocharger exceeds a given value, it determines that a temporary gear shift is taking place during an accelerating phase or the like, and in this instance it does not output the calculated duty value directly, but instead provides a restricted output. The restriction is implemented by adding a selected value to the current duty value which is presently used to control the turbocharger, for subsequent use as an output duty value. Accordingly, if the calculated value from the calculating means 105 is very high, an output from the limiter means does not exceed the sum of the current duty value plus a selected value. On the other hand, if the calculated value is less than such sum, this does not represent a rapid change, and hence the calculated value from the calculating means 105 is directly outputted.

A duty value which is output from the limiter means 107 is applied to the solenoid valve 57 to control the movement of the hinged flap 25 through the diaphragm 35 and the rod 31, as mentioned above in connection with FIG. 2.

Figure 5:
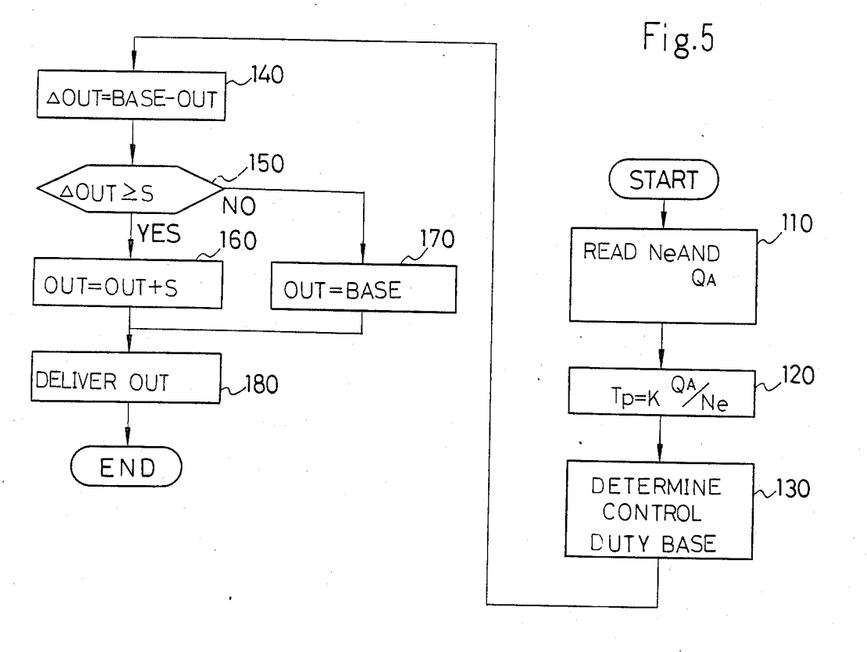
FIG. 5 is a flow chart illustrating the operation of the control system of FIG. 4.

Referring to FIG. 5, a flow chart which illustrates the operation of the invention will now be described. In step 110, the number of revolutions Ne of the engine and the amount of intake air $Q_A$ are read from the crank angle sensor 83 and the airflow meter 11, respectively. In step 120, the arithmetic means 103 determines the width Tp of fuel supply pulse in accordance with the equation given above, based on such information. In Step 130, the pulse width Tp and the number of revolutions Ne determined in this manner are fed to the duty value calculating means 105, which obtains a duty value corresponding to the pulse width Tp and the number of revolutions Ne supplied, from the memory, thus establishing a basic control value BASE, which is then output to the limiter means 107.

In step 140, the limiter means 107 subtracts a control value OUT, which represents a current duty value presently used in controlling the variable geometry turbocharger, from the basic duty value BASE supplied from the calculating means 105. thus deriving a difference ΔOUT therebetween. In step 150, the difference ΔOUT is compared against a given value S. If the difference ΔOUT exceeds the given value S, signifying a sharp increase in the duty value, a decision is rendered that a rapid increase is temporarily occurring in the duty value as a result of a gear shift. In this instance, the basic control value BASE from the calculating means 105 is not directly outputted, and the program proceeds to a step 160 where the given value S is added to the current duty value OUT for output. Subsequently, in step 180, this sum is delivered to drive the solenoid valve 57. It is to be noted that the step of restricting the output by adding the given value S to the current control value OUT takes place once during each pass through the program shown in FIG. 5. Accordingly, the duty value is incremented by the given value S in each pass or cycle, thus preventing a rapid increase. Consequently, the output duty value from the limiter means 107 is not allowed to increase rapidly, but changes gradually. In the meantime, the gear shift is completed and the system resumes the accelerating operation, thus preventing the duty value from increasing to 100%. If it is determined that the difference OUT is less than the given value S at the step 150, no rapid change is occurring in the duty value, and hence the program proceeds to a step 170 where the basic control value BASE from the calculating means 105 is allowed to be output as the control value BASE from the step 180.

Figure 6:
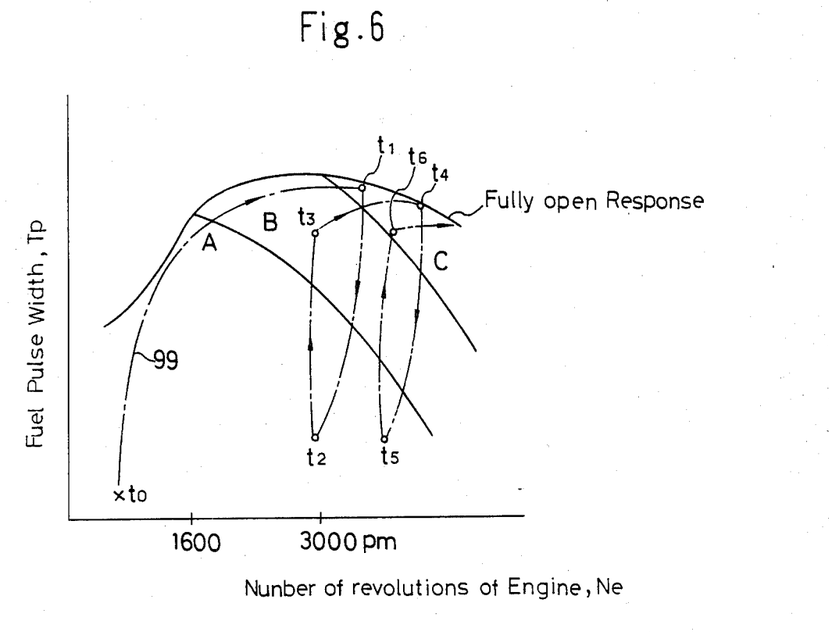
FIG. 6 graphically illustrates a change in the operating point during a gear shift.
Figure 7:
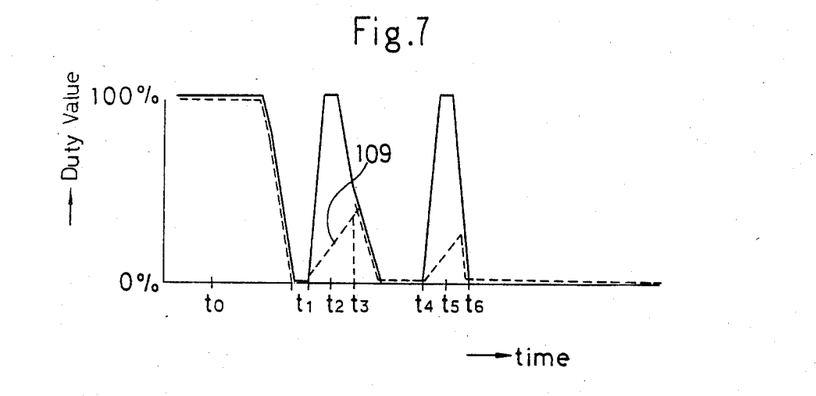
FIG. 7 graphically illustrates a change in the duty value which occurs during a gear shift.

Referring to FIGS. 6 and 7, the operation of the described embodiment will now be described in terms of a change in the operating point of the engine and change in the duty value, which occur as a result of a gear shift. FIG. 6 graphically illustrates the width Tp of fuel feed pulse plotted against the number of revolutions Ne of the engine, in the similar manner as shown in FIG. 3, and in addition it illustrates a curve shown in phantom lines which represents a movement of the operating point during the gear shift. FIG. 7 graphically shows a change in the duty value of a control signal which drives the solenoid valve 57, with respect to time or individual operating points. Specifically, at time $t_0$ where the engine assumes an idling condition and starts its acceleration to speed 1, the number of revolutions Ne is low as is the pulse width Tp. The duty value is at 100% at the intial operating point. As indicated by the phantom line curve 99 in FIG. 6, the number of revolutions Ne does not increase immediately, but the pulse width Tp increases rapidly. The operating point moves into the region B with time, and the duty value begins to decrease from 100% as shown in FIG. 7, and when the operation point enters the region C at time $t_1$, the duty value reduces to 0%. If a driver now releases an accelerator pedal to effect a gear shift from speed 1 to speed 2, the pulse width Tp reduces rapidly, and the operating point again moves into the region A at time $t_2$. According to the practice of the prior art, the duty value will rapidly change from 0% to 100% against, as indicated by a solid line curve in FIG. 7. However, in the arrangement of the invention, the duty value changes gradully and does not increase to 100%, as indicated by a broken line curve 109. In the meantime, a gear shift to the speed 2 is completed, and the driver again depresses the accelerator pedal to effect an acceleration. Then the pulse width Tp increases rapidly as indicated by a change from time $t_2$ to time $t_3$, but the duty value begins to decrease from a point which is less than 100%. At time $t_4$, the operating point enters the region C where the duty value assumes 0%. If additional gear shifts are repeated from speed 2 to speed 3 or from speed 3 to speed 4, the duty value varies only within a relatively small range of values as indicated by the broken line curve 109, rather than rapidly changing between 0% and 100% as occurs in the prior art. Consequently, the solenoid valve 57 which is driven with such duty value is operative to open or close to a substantially lesser degree than in the prior art, rather than alternating between the fully open and the fully closed condition as experienced with the conventional arrangement. As a consequence, the abrasion of the variable capacity means including the hinged flap 25 is substantially reduced.

In the described embodiment, a rapid change in the duty value in the increasing direction is restricted by using a sum of the given value S added to the current duty value which is presently used to control the variable geometry turbocharger so as to permit a gradual increase. However, it should be understood that alternative techniques may be used as by detecting a rapid change in the duty value which may occur during a gear shift, and providing a dead time during which the control over the duty value is temporarily delayed or inhibited, thus preventing the variable capacity means such as the hinged flap 25 from being operated during the gear shift.

Further, the pulse width Tp is calculated on the basis of the amount of intake air $Q_A$ and the number of revolutions $N_c$ to determine the duty value in the described embodiment. However, the amount of intake air $Q_A$ per se can be used in lieu of the pulse width Tp to determine the duty value.

In addition, in this described embodiment, the limiter means 107 is interposed between the calculating means 105 and the control means or solenoid valve 57 in series to supply the control means or solenoid valve 57 with a corrected signal. However, the limiter means 107 can be positioned in parallel to the control means or solenoid valve 57 to receive the same signal to be sent to the control means or solenoid valve 57 and to limit the operation of the control means or solenoid valve 57.

It is to be understood that these modifications and changes may be made within the scope of the present invention as defined by the appended claims.

What is claimed is:

1. A control system for a variable geometry turbocharger for an internal conbustion engine including a turbine having a variable area inflow passage, said turbine being operated in response to an exhaust gas flow supplied through said variable area inflow passage, and a compressor adapted to be driven by said turbine; said control system comprising means for detecting operating conditions of said engine, a control means including arithmetic means which calculates a first control value for controlling the cross-sectional area of the variable area inflow passage to provide a suitable supercharging pressure of intake air supplied to said engine in response to said detected operating conditions of said engine, a first variable geometry valve means for changing the cross-sectional area of the variable area inflow passage, means for actuating the variable geometry valve means in accordance with said first control value; and a limiter means for changing said first control value so as to restrict a reduction of the cross-sectional area of said variable area inflow passage when the calculated control value has reached a predetermined value after being changed to reduce the cross-sectional area of the variable area inflow passage.

2. A control system as claimed in claim 1, wherein said limiter means is constructed such that when said control value is not less than said predetermined value, a given additional value is added to said first control value so as to restrict the reduction of the cross-sectional area of said variable area inflow passage, and when said control value is less than said predetermined value, no additional value is added to said first control value.

3. A control system as claimed in claim 1, wherein said limiter means is constructed such that, when said control value is not less than said predetermined value, said first control value is controlled by said limiter means so as to stop the reduction of the cross-sectional area of said variable area inflow passage.

4. A control method for a variable geometry turbocharger for an internal combustion engine including a turbine operated in response to an exhaust gas supplied therein and a compressor adapted to be driven by said turbine to generate a supercharging pressure to said engine, said method comprising the steps of:
   detecting operating conditions of said engine;
   inputting said operating conditions into a control unit to determine a control value therein, and controlling a variable geometry valve means disposed upstream of said turbine on the basis of said control value, thereby maintaining said supercharging pressure moderate;
   wherein said variable geometry valve means includes at least one of a first variable geometry valve disposed just upstream of said turbine and a second variable geometry valve disposed just upstream of said turbine and a second variable geometry valve disposed between said engine and said turbine and wherein a reducing rate of the cross-sectional area of said first variable geometry valve is restricted when the change in said calculated control value is equal or greater than a given value.

5. The control method according to claim 4, wherein said first variable geometry valve is disposed in a variable area inflow passage of said turbine, the cross-sectional area of which is varied in accordance with the rotational speed of said engine.

6. A control system for a variable geometry turbocharger for an internal combustion engine including a turbine having a variable area inflow passage, said turbine being operated in response to an exhaust gas supplied through said variable area inflow passage, and a compressor adapted to be driven by said turbine, said control system comprising:
   means for detecting operating conditions of said engine;
   a control means including arithmetic means which calculates a first control value used in controlling a cross-sectional area of the variable area inflow passage to provide a proper supercharging pressure of intake air supplied to said engine in response to said detected operating conditions of said engine;
   a first variable geometry valve means for changing the cross-sectional area of the variable area inflow passage;
   means for actuating said variable geometry valve means in accordance with said first control value; and
   limiter means operative to restrict said first control value so as to restrict a reduction in the cross-sectional area of said variable area inflow passage whenever the calculated first control value changes in a direction to reduce the cross-sectional area of the variable area inflow passage and such change is equal to or greater than a given value;
   wherein when the change in the control value is greater than said given value, said first variable geometry valve means is prevented from excessively reducing the cross-sectional area of the variable area inflow passage.

7. A control system for a variable geometry turbocharger for an internal combustion engine including a turbine having a variable area inflow passage, said turbine being operated in response to an exhaust gas supplied through said variable area inflow passage, and a compressor adapted to be driven by said turbine, said control system comprising:
   means for detecting operating conditions of said engine;
   a control means including arithmetic means which calculates a first control value used in controlling a cross-sectional area of the variable area inflow passage to provide a proper supercharging pressure of intake air supplied to said engine in response to said detected operating conditions of said engine;

a first variable geometry valve means for changing the cross-sectional area of the variable area inflow passage;

means for actuating said variable geometry valve means in accordance with said first control value; and limiter means operative to restrict said first control value so as to restrict a reduction in the cross-sectional area of said variable area inflow passage whenever the calculated first control value changes in a direction to reduce the cross-sectional area of the variable area inflow passage and such change is equal to or greater than a given value;

wherein when the change in the control value is greater than the given value, a reduction in the cross-sectional area of the variable area inflow passage is restricted by disabling said first variable geometry valve means for a given time interval.

8. A control system for a variable geometry turbocharger for an internal combustion engine including a turbine having a variable area inflow passage, said turbine being operated in response to an exhaust gas supplied through said variable area inflow passage, and a compressor adapted to be driven by said turbine, said control system comprising:

means for detecting operating conditions of said engine;

a control means including arithmetic means which calculates a first control value used in controlling a cross-sectional area of the variable area inflow passage to provide a proper supercharging pressure of intake air supplied to said engine in response to said detected operating conditions of said engine;

a first variable geometry valve means for changing the cross-sectional area of the variable area inflow passage;

means for actuating said variable geometry valve means in accordance with said first control value;

wherein said engine has an exhaust manifold provided with a second variable geometry valve means upstream of said variable area inflow passage, and said arithmetic means calculates a second control value used in controlling the opening degree of said second variable geometry valve means, and wherein a means is provided for actuating said second variable valve means in accordance with said second control value.

9. The control system according to claim 8, wherein said means for actuating said first and second variable geometry valve means include a solenoid valve, respectively.

10. A control system for a variable geometry turbocharger for an internal combustion engine including a turbine having a variable area inflow passage, said turbine being operated in response to an exhaust gas supplied through said variable area inflow passage, and a compressor adapted to be driven by said turbine, said control system comprising:

means for detecting operating conditions of said engine;

a control means including arithmetic means which calculates a first control value used in controlling a cross-sectional area of the variable area inflow passage to provide a proper supercharging pressure of intake air supplied to said engine in response to said detected operating conditions of said engine;

a first variable geometry valve means for changing the cross-sectional area of the variable area inflow passage;

a solenoid for actuating said variable geometry valve means in accordance with said first control value; and limiter means operative to restrict said first control value so as to restrict a reduction in the cross-sectional area of said variable area inflow passage wherever the calculated control value changes in a direction to reduce the cross-sectional area of said variable area inflow passage and such change is equal to or greater than a given value, said second variable geometry valve means being progressively opened when the supercharging pressure is equal to or greater than a predetermined value with the cross-sectional area of said variable area inflow passage being maximized.

11. A control system for a variable geometry turbocharger for an internal combustion engine including a turbine having a variable area inflow passage, said turbine being operated in response to an exhaust gas supplied through said variable area inflow passage, and a compressor adapted to be driven by said turbine, said control system comprising:

means for detecting operating conditions of said engine;

a control means including arithmetic means which calculates a first control value used in controlling a cross-sectional area of the variable area inflow passage to provide a proper supercharging pressure of intake air supplied to said engine in response to said detected operating conditions of said engine;

a first variable geometry valve means for changing the cross-sectional area of the variable area inflow passage;

means for actuating said variable geometry valve means in accordance with said first control value; and wherein said operating conditions include a rotational speed of said engine and a load on said engine, and wherein said control unit calculates on the basis of the amount of intake air and the rotational speed of the engine the amount of intake air per engine revolution which is equivalent to the width of a fuel feed pulse for fuel injection, and stores control values with respect to the width of said fuel feed pulse and the rotational speed of said engine to produce moderate supercharging pressure.

12. A control method for a variable geometry turbocharger for an internal combustion engine including a turbine operated in response to an exhaust gas supplied therein and a compressor adapted to be driven by said turbine to generate a supercharging pressure to said engine, said method comprising the steps of:

detecting operating conditions of said engine;

inputting said operating conditions into a control unit to determine a control value therein, and controlling a variable geometry valve means disposed upstream of said turbine on the basis of said control value, thereby maintaining said supercharging pressure moderate;

wherein said operating conditions include a rotational speed of said engine and a load on said engine, and wherein said control unit calculates on the basis of the amount of intake air and the rotational speed of the engine the amount of intake air per engine revolution which is equivalent to the width of a fuel feed pulse for fuel injection, and stores control values with respect to the width of said fuel feed pulse and the rotational speed of said engine to produce moderate supercharging pressure.

13. The control method according to claim 12, wherein the width of a fuel feed pulse and the rotational speed of said engine are used to determine the opening degree of said variable geometry valve means.

14. The control method according to claim 12, wherein each of said control values is fed to a limiter means to check the rate per unit time at which said control value changes and to correct said control value for restriction when said changing rate is greater than a predetermined level.

15. The control method according to claim 14, said changing rate greater than said predetermined level means that said variable geometry valve means reduces the cross-sectional area thereof to excessively increase said supercharging pressure.

16. The control method according to claim 14, wherein said predetermined level is determined on the basis of the currently used control value plus a predetermined factor.

* * * * *